Feb. 11, 1964   F. S. COPELAND   3,121,021
BREATHABLE SURGICAL ADHESIVE TAPES
Filed April 18, 1960
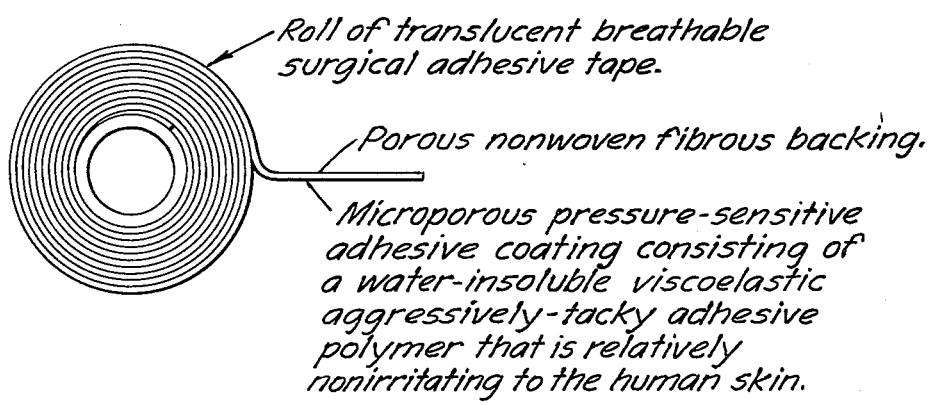
INVENTOR
FRANK S. COPELAND
BY Carpenter, Abbott, Coulter & Kinney
ATTORNEYS

United States Patent Office 3,121,021
Patented Feb. 11, 1964

3,121,021
BREATHABLE SURGICAL ADHESIVE TAPES
Frank S. Copeland, St. Paul, Minn., assignor to Minnesota Mining and Manufacturing Company, St. Paul, Minn., a corporation of Delaware
Filed Apr. 18, 1960, Ser. No. 22,705
5 Claims. (Cl. 117—122)

This invention relates to a new and useful type of breathable, porous, pressure-sensitive adhesive tape, and to the novel process of manufacturing. The invention provides novel surgical tapes which possess a unique combination of properties of value to this field of use.

The preferred surgical tape is illustrated in the accompanying schematic drawing.

An outstanding feature is that this new type of surgical tape is relatively nonirritating to the skin of most persons and does not cause maceration of the skin even after prolonged adhesive contact therewith. ("Maceration" is a condition of the skin induced by prolonged contact with an adhesive tape whereby the skin becomes soft, wrinkled and white due to the inability of the skin to breathe and to eliminate perspiration, and also due to its being shielded from air and light.)

The present tape has a porous backing (preferably a unified inextensible nonwoven fibrous fabric) carrying a continuous but microporous pressure-sensitive adhesive coating. This rubbery-base adhesive is water-insoluble and viscoelastic, and the coating is aggressively tacky in its normal dry state. This adhesive coating penetrates into said nonwoven porous fibrous backing and is firmly anchored to provide a unitary integrated structure that will not delaminate or split when the tape is unwound or removed.

The novel process of forming the continuous adhesive coating is of such a nature that, during the drying of the coating, innumerable, pore-like apertures spontaneously develop therein and these pores result in a viscoelastic porous adhesive membrane covering the porous backing. These pores are so tiny that they are not visible to the human eye upon casual inspection of the tape—the adhesive coating thus being of a visibly continuous nature. They are, however, of sufficient size and closeness together to permit of ample transpiration of skin moisture and wound vapors, and to permit of absorption of liquid material therethrough into the porous tape backing. The effect is essentially uniform over the entire contacted body area; as distinguished from the effects produced by tapes which have relatively large holes or apertures therein, or which have been perforated by needles, or which have discontinuous spaced-apart stripes or spots of ordinary impermeable adhesive on a porous backing, to obtain a so-called "breathable" tape, as suggested in the prior art. The continuous uniform microporous reticular nature of the present tape is a decided advantage.

A feature of the manufacturing process is that use can be made of rubbery-base pressure-sensitive adhesive coating compositions that are free from extraneous or undesirable non-volatile components or ingredients, and from liquid plasticizers, thereby avoiding the presence in the dried adhesive coating of substances which impair adhesion or cohesion or which may cause or promote skin irritation. For instance, use can be made of pure viscoelastic polymers which are inherently aggressively tacky and highly cohesive and which are relatively non-irritating to the human skin, such as the pressure-sensitive acrylate polymers described in Ulrich's U.S. Patent No. 2,884,126 (April 28, 1959), since reissued as Re. 24,906. This latter adhesive is not only water-insoluble but it is hydrophobic as indicated by the fact that drops of water deposited on the surface do not flow out and wet the surface. The microporosity of the adhesive coating obviates the need of including any moisture-absorptive material in the adhesive composition.

This also permits of transparent adhesive coatings. When a translucent backing is used in combination therewith (such as the preferred nonwoven fibrous backing) a translucent tape can be provided which is sufficiently transparent to permit the reading of printed matter over which the tape has been adhered. This high degree of translucency is advantageous in surgical tapes in permitting observation of underlying conditions without removing the tape from the body. And in combination with the feature of porosity, uniform access of the underlying body region to both light and air is permitted by the present tape. It is desirable to maintain the skin as nearly as possible in its normal exposed condition.

A further important consequence is that tapes can be provided which are transparent to X-rays. Tape strappings do not have to be removed to permit of clear X-ray observations and photographs, in contrast to conventional surgical tapes having opaque adhesives loaded with zinc oxide pigment.

Another obtainable feature is an outer (exposed) surface of the porous adhesive coating that is very smooth and may even exhibit lustrous areas when angularly illuminated and observed, although it is a matte type of surface. The use of a thin and pliant nonwoven backing carrying a thin smooth adhesive coating results in a highly conformable tape which is more comfortable to the patient and makes for less bulky dressings. Use of an adhesive which is aggressively tacky but is more rubbery and firmer than conventional surgical tape adhesive (which are loaded with softeners and pigments) is desirable, and is provided by the previously mentioned acrylate polymer adhesive. Such tape can be removed more readily and comfortably from the skin after prolonged contact and yet is readily applied and immediately adheres to the skin with adequate adhesion when pressed into place. The use of a nonwoven inextensible resilient fibrous backing, which does not appreciably stretch under normal hand pulling, has the advantage that the tape will retain or hold the skin in its initial position and that strappings will not develop slackness; which is not true of conventional cloth-backed surgical tapes.

The present process can be used to provide microporous adhesive coatings on woven cloth backings (including the type commonly employed in surgical tapes). However, thin nonwoven inextensible porous backings are required to achieve the unique surgical tape having the combination of desired features previously indicated.

The preferred backing is a nonwoven compacted tissue formed of interlaced staple rayon (or equivalent) textile fibers (having a length of about 1 to 2 inches) which is unified by impregnation with a water-insoluble rubbery fiber-binding sizing agent (such as a rubbery acrylate polymer latex) that coats the individual fibers (without filling the interstices) and bonds them together at their crossing points; such as to result in a thin, pliable, inextensible, resilient, water-resistant, translucent, porous, clothlike fabric that is strong and tough enough for surgical tape usage and yet is finger-tearable so that the tape can be applied from a roll without having to be cut. This unified nonwoven reticular fibrous backing has a very large number of minute interfilar passageways per square inch (or square centimeter) and is highly porous. The reticulate structure of the backing performs a physical function in bringing about the transformation of the applied adhesive coating from a nonporous to a porous state during manufacture of the tape, by the process presently to be described, and the preferred non-woven type of backing is particularly well suited to perform this function.

In any case, the viscoelastic pressure-sensitive adhesive is applied to the porous backing fabric in such a way as to provide thereon a continuous soft sticky viscid coating containing a volatile vehicle which is in small enough proportion to avoid wicking or penetration of the adhesive through the body of the porous backing, when it is promptly dried after application. The volatile vehicle is, however, present in sufficient substantial proportion to enable the viscid adhesive coating to penetrate into and interlock with the backing and to have a tendency to be drawn by capillarity into the pores. Further drying of this semi-dry adhesive coating results in progressive loss of the residual volatile vehicle and a shrinkage of the coating. These capillary and shrinkage effects produce a strain in each tiny portion of the viscoelastic adhesive film which bridges a backing passageway, and in yielding to this strain one or more minute openings (pores) are autogenously formed therein. In this way the entire adhesive coating, during drying, autogenously develops a vast number of closely spaced pores per square inch, producing a microporous recticulated structure in an adhesive film that remains visibly continuous and is interlocked with the fibers of the backing to provide a unitary microporous fibro-adhesive web.

The necessary degree of adherency of the tape is not prevented by the presence of these pores. The viscoelastic property of the adhesive prevents the pores from closing up even during prolonged pressing of the adhesive in a roll of tape and even when the tape is used for strapping.

A convenient way to carry out this process is to first prepare in the usual way a solution of the adhesive in sufficient solvent (volatile vehicle) to provide a coatable viscosity. This adhesive solution is then coated on a liner web having a dense, nonporous, shiny-smooth surface of an "anti-stick" nature that will permit of ready separation from the adhesive coating in its subsequent semi-dried and fully-dried states. An example is a smooth-surfaced paper coated with polyethylene or a silicone resin having the desired release or parting property. This adhesive coating is partially dried by passing the web into a hot air drying oven or over a heated drum, and is brought into laminar bonding contact with a superimposed web of the porous backing fabric. The resulting "sandwich" web is then promptly further heated to eliminate the residual solvent from the adhesive coating, during which interval the adhesive coating acquires the desired porous state (which is retained in the fully dried product) and upon completion of the drying operation to fully remove the solvent, it is wound up in a jumbo roll. Drying of the applied adhesive coating layer is conducted with sufficient promptness to prevent the adhesive from soaking or striking through the body of the porous backing. The evaporating solvent is free to escape through the porous backing web. Drying of the adhesive coating while at all stages in contact with the impermeable, smooth, shiny surface of the liner, results in the dried adhesive coating having a smooth dense outer surface characteristic. During the porosity-inducing phase of the drying, the adhesive contact to the liner is disrupted at the points where the pores are formed. This is permitted by the anti-stick surface which allows the adhesive to pull away from it where the pores develop, leaving the surrounding adhesive surfaces in continued contact with the liner surface.

This dried composite sheeting is subsequently unwound from the jumbo roll, the liner is stripped off, and the adhesive-coated web is slit and wound upon itself in tape rolls of desired size. If desired, the liner can be left in place during slitting and winding to facilitate subsequent handling of the tape; as in withdrawing tape from a large roll and (after removal of the liner) fabricating first aid bandage or corn plaster strips which carry a medicated or nonmedicated pad adhering to the adhesive surface. The liner-carrying tape can also be cut into strips of desired length to be packaged and sold as wound-closure tapes, the liner covering the adhesive surface until it is removed just prior to use of the tape.

Instead of using a liner web in the manufacture of the tape (as just described), the adhesive solution can be coated on a moving endless casting belt or drum having a polished anti-stick surface, such as are known in the film-casting art. After preliminary partial drying of the adhesive coating, the tape backing web is laid on the adhesive layer and further drying is employed to produce the porous adhesive web product. The dry product is then stripped from the belt or drum and is either directly slit and wound into tape rolls or is combined with a smooth-surfaced anti-stick liner web and handled as previously described. It will be evident that these procedures also result in a tape having a smooth adhesive surface.

Another alternative is to pull the porous backing web around on a rotating heated drum serving as a support and a heating means. The adhesive solution is coated on the web as it rests on the drum, and a high enough drum temperature is employed to quickly dry the coating before it has a chance to wick through the body of the web. The adhesive coating develops the desired porous structure while the web is still on the drum. The dried product is then handled as before. In this last alternative, the adhesive coating is dried with its external surface exposed to the atmosphere and does not have the degree of smoothness that is obtainable when the adhesive is dried in contact with an impermeable shiny-smooth supporting surface as in the earlier-described procedures. However, greater smoothness can be imparted by applying a shiny-smooth anti-stick liner to the adhesive side of the web and winding in a roll which is then stored before unwinding and slitting.

Inextensible tapes of even greater lengthwise tensile lengthwise tensile strength, especially suitable as high-strength strapping tapes, can be provided by incorporating lineally-aligned continuous (endless) rayon filaments or the like in the aforesaid nonwoven type of backing, to provide lengthwise reinforcement without loss of desired flexibility and porosity. Thus two fibrous plies can be combined so as to envelop interposed reinforcing filaments, and the composite then compacted and impregnated with the fiber-binding sizing material to provide a unified porous backing fabric.

Suitable fibrous fabrics can also be made by wet-laid (paper-making) procedures using staple rayon or other textile fibers.

Combinations of interlaced fibers of different types can be employed, such as a mixture including thermoplastic polyester binder fibers, such that upon hot pressing or calendering of the fibrous web the latter fibers will soften and bind or unify the fibrous structure of the porous product.

*Example*

This example further illustrates the invention by describing a presently preferred embodiment of the adhesive tape and process of making.

Staple viscose-rayon textile fibers having a length in the range of about 1 to 2 inches, are formed into a continuous fluffy web by a garnett machine or the like, or by a "Rando-Webber" machine (sold by Curlator Corp., Rochester, N.Y.). A typical web is composed of 1½ denier fibers of 1¼ inch length adapted to provide a fiber weight in the finished fabric of about 75 to 100 pounds per thousand square yards. The nonbundled staple fibers are thereby randomly interlaced into a loose fluffy layer wherein the fibers cross over and under each other so as to be held together by mechanical and frictional forces.

This fluffy fiber web is then fed through the nip of a pair of horizontal squeeze rolls, the lower one of which dips in an aqueous bath of fiber-binding rubbery sizing latex. This results in the fluffy web being compacted to a tissue-like condition and being wetted and impregnated without excess by the sizing solution. The moving web is then dried by engagement with a series of rotating heated drying cylinders located below a forced-draft ventilating hood, thereby unifying the fabric by adhesive interbonding of the interlaced fibers at their crossing points by means of the dried sizing agent, which also imperceptibly coats the individual fibers without filling up the interstices or appreciably affecting the porosity of the product. The sizing also prevents fuzzing. This provides the porous backing upon which the adhesive is to be subsequently applied.

The preferred sizing agents are water-dispersible rubbery acrylate polymer latices which dry on the fibers to a nontacky state. These are well known in the textile industry. A suitable example is "Rhoplex B–15," sold by Rohm & Haas Co., an aqueous dispersion containing 46% acrylic polymer solids by weight, and which is diluted with water to provide a sizing bath having a polymer solids concentration of about 28%. The concentration is adjusted so that the finished dried fabric will have a polymer sizing weight of 30–70% of the total fabric weight, and preferably about equal to the fiber weight.

This translucent unified nonwoven fabric, although thinner and more pliant than the cloth backings of conventional surgical tapes, has adequate tensile strength, toughness, resiliency and inextensibility for surgical strapping tapes. Yet it permits of a tape that is finger-tearable, and of tape rolls that can be employed in conventional pressure-sensitive tape dispensers of the type having a serrated severing blade. This backing is several hundred times as porous to air as absorbent paper towelling and does not interfere with the transpiration of air and moisture by the adhesive tape product, being much more porous than the adhesive coating. The sized fibers thereof are not water-absorptive and in fact are water-repellent as shown by the fact that a drop of water placed on the fabric surface does not spread out and wet the surface. However, wound liquids and perspiration transmitted through the porous adhesive coating are readily absorbed into the porous capillary structure of the fabric, thereby also promoting transpiration through the adhesive. The excellent wet strength of the fabric prevents it from being seriously weakened by absorbed liquids or during washing of the patient.

The presently preferred pressure-sensitive adhesive is a pure rubbery copolymer of isooctyl acrylate and acrylic acid in 94:6 ratio; this type being described in Ulrich's U.S. Patent No. 2,884,126 (April 28, 1959). The original solvent dispersion thereof is coated on a heated drum from which the dried polymer is removed and redispersed in a mixed solvent of heptane and isopropyl alcohol (70:30) to provide a 22% solution of coatable viscosity. This procedure eliminates volatile ingredients of the original polymer solution.

This adhesive solution is then coated on a moving liner having an insoluble, heat-resistant, shiny-smooth, anti-stick surface (such as a paper liner carrying a silicone resin release coating) in a wet coating weight adequate to provide a dry adhesive weight of about 50 pounds per thousand square yards. This wet adhesive coated web is promptly drawn into and through a hot air heating oven so arranged that after initial drying of the adhesive to a semi-dry state, the above-described backing web is layed down on the adhesive and becomes adhesively laminated thereto. An air temperature of 100–150° F. is preferably employed. Too high a temperature will cause a spongy adhesive coating or make control difficult. The objective at this point is to partially dry the adhesive to a degree that will prevent wicking through the superimposed porous backing fabric and yet retain enough solvent in the adhesive coating to develop the desired microporous structure after lamination. The degree of porosity that is developed is roughly inversely proportional to the heating interval in this stage. In this example, a pre-lamination drying interval of approximately ½ minute at 100° F. has been found satisfactory under the conditions employed. However, the optimum time for any given factory installation should be determined by trial-and-error, as it is dependent upon the oven arrangement and operating conditions. Adjustment can be made by varying the rate of travel of the web. Continuing through the drying oven, the laminated "sandwich" web is further heated to develop the microporous adhesive structure and then to fully eliminate residual solvent and thereby complete the drying. In this example, satisfactory results have been obtained by passing the laminated web through successive oven sections adapted to heat it at 100° F. for 2½ minutes, then at 150° F. for 2½ minutes, and finally at 200° F. for 1½ minutes.

The resultant adhesive sheeting has a caliper thickness of 4 to 6 mils (100 to 150 microns). The thin adhesive coating (which extends into the fibrous backing) contributes only about ½ mil (about 15 microns) of the total thickness.

Preferably, a discontinuous low-adhesion backsizing is then imparted to the exposed surface of the backing fabric so as to coat the exposed fiber surfaces without materially reducing the porosity. This sizing coating on the fibers is so extremely thin as to be imperceptible. This low-adhesion backsizing results in a fibrous back surface having a reduced adhesion to the tacky pressure-sensitive adhesive and permits of linerless rolls of tape that can be unwound with less effort than would be the case if this backsize were omitted. The adhesion is, however, sufficient to permit of adequate adhesion between overlapping windings of tape, as when it is used as a strapping tape. A preferred low-adhesion backsize is a urethane (carbamate) copolymer of polyvinyl alcohol and octadecyl isocyanate. See U.S. Patent No. 2,532,011 (Nov. 28, 1950). It provides a water-insoluble and hydrophobic sizing on the fibers.

After drying of the backsizing, the liner-mounted adhesive-coated web is wound into large jumbo rolls, and is ready for subsequent conversion into tape rolls of desired width and length. The backing is of a nature that permits slitting of tape with straight non-ravelling edges. The tape has a transparent adhesive coating and is highly translucent, such that if adhered to a printed surface the printing can be read through it. This tape can be sterilized whenever desired, as by use of radiation, by use of steam, or by use of ethylene oxide gas employed at a temperature between room temperature and 180° F. Sterilization is desirable in manufacturing strips of tape (such as wound closure tapes) mounted on a removable liner and sold in sterile packages.

The pores in the adhesive coating vary randomly in size and range in diameter from 1 to 100 microns, with occasional pores exceeding the latter figure. Pores under 20 microns in diameter provide about 50% of the total pore volume. The transpiration porosity of the tape is such as to provide a moisture vapor transmission rate that exceeds the perspiration emission rate of the human skin under ordinary conditions. The porous adhesive coating is hydrophobic but is (in common with other such adhesives) capable of softening and swelling upon prolonged contact with liquid perspiration. However, due to transpiration of perspiration through the pores, there is much less tendency for the adhesive to soften or lose tackiness upon prolonged contact with perspiring skin, than is the case where the ordinary non-porous type of adhesive is used. Perspiration from the underlying skin can pass through the adhesive coating either as vapor, or as liquid which is adsorbed by the porous capillary structure of the backing and thence evaporated, so that in any case the skin is maintained in a dry state under ordinary conditions. These features result in retention of the tape and the skin in the initial position. This is particularly important in the case of wound closure tapes, i.e., tape strips used for closing cuts or wounds and keeping them closed during healing, thereby in many cases avoiding the need of suturing.

Other features of this novel surgical tape are: It can be unwound from a linerless roll with much less effort than conventional surgical tapes, an advantage that is particularly noteworthy in comparing tapes that have been stored for a considerable period after manufacture and before use. This feature in combination with finger-tearability greatly facilitates application to the body, especially in strapping applications. The tape can be handled both with bare fingers and with rubber-gloved fingers without danger of sticking and its use does not result in the tearing of rubber gloves, as sometimes happens with conventional surgical tape. If adhesive surfaces of a strip of tape happen to come into mutual contact, ready separation is permitted and there is no distortion of the tape.

The following laboratory test data quantitatively illustrate the high moisture vapor transmission of the present adhesive tape:

Use is made of a flat rectangular brass test dish having a vertical sidewall with a broad flat outwardly flanged top perimeter. The inside dimensions are 4 inch by 1 inch with a 1 inch depth, to provide a vapor transmission area of 4 sq. in. The test specimen of tape or other sheet material is cut to a 2 in. by 5 in. rectangular shape. The bottom of the dish is covered with granular anhydrous calcium chloride. The specimen is applied over the opening so as to lie flat, and, in the case of pressure-sensitive tape is adhered to the flange by finger pressure sufficient to effect a perfect seal. Any non-adherent specimen that is to be tested for comparison purposes is sealed to the flange with adhesive tape. The dish carrying the mounted specimen is weighed and is then immediately placed in a humidity cabinet maintained at a temperature of 100° F. and a relative humidity of 90 to 95%. At the end of a 20 minute exposure period the dish is removed and weighed. It is then returned to the humidity cabinet for a second 20 minute exposure period and removed and weighed. The gain in weight during exposure represents the moisture transmitted through the test specimen. The values are converted to figures representing moisture vapor transmission rates expressed in grams per 100 square inches per 24 hours. The values based on either 20 minute or 40 minute exposure should agree within 10%. The rate values given below are rounded average values based on several tests of each type.

Comparison was made between:
(1) An open test dish (no specimen).
(2) Porous tape backings of this "example" (free from adhesive).
(3) Adhesive tapes made in accordance with this "example."
(4) Ordinary cloth-backed surgical adhesive tape that had been purchased at a drug store. In this case, owing to the highly impermeable nature of the tape and to the moisture absorptiveness of the cloth backing, the dish with the mounted specimen was first conditioned by 24 hours exposure in the humidity cabinet, then weighed, then placed in the cabinet for 48 hours, reweighed, and the weight difference converted into the moisture transmission rate value (grams per 100 square inches per 24 hours).

The following table lists the results:

| Specimen— | Rate value |
|---|---|
| (1) | 2000–2400 |
| (2) | 500–600 |
| (3) | 100–200 |
| (4) | 3–6 |

The pure acrylate polymer adhesive of this example is per se aggressively tacky and pressure-sensitive and thus requires no addition of tackifying resins or plasticizers. This adhesive is nonoxidizing and hence needs no inclusion of an antioxidant. The polymer sizing and the fibers of the backing fabric contain no plasticizer which, if such were present, would tend to migrate into the adhesive and render it irritating to the skin. This adhesive polymer has been demonstrated, by extensive use of the tape, as well as by skin patch tests, to be relatively non-irritating to the skin in comparison to the plasticized rubber-resin zinc oxide compositions traditionally employed in surgical tapes. It has been found in practice during a test program that many persons can tolerate the present tape even though they are highly sensitive to conventional tapes.

An example of a similar acrylate polymer adhesive is a 92.5:7.5 copolymer of 2-ethyl hexyl acrylate and acrylic acid, dispersed to a coatable viscosity in a 50:50 ethyl acetate:heptane mixed solvent. Still other examples of acrylate polymer adhesives are: a methyl isoamyl acrylate homopolymer; and a 75:25 copolymer of 2-ethyl butyl acrylate and ethyl acrylate, preferably cross-linked with a small proportion of diamyl ethylene dimaleate. However, suitable blends of rubbery polymers and tackifying resins (free from liquid plasticizers) can be used. Aqueous adhesive dispersions can be employed, the process not requiring that the adhesive be dispersed or dissolved in an organic vehicle. The utility of the type of tape provided by this invention is not limited to surgical uses involving contact with the human skin, and for such other uses the stringent requirements desired in surgical tapes need not be met.

I claim:
1. A nonwoven fibrous translucent microporous breathable surgical adhesive tape consisting essentially of: (A) a thin compacted tissue-like web of randomly interlaced staple textile fibers which are individually coated and are interbonded at their crossing points by a nontacky hydrophobic rubbery fiber-sizing polymer having a weight of about 30–70% of the total fabric weight, such as to provide water-repellent sized fibers and wet strength in a unified resilient reticular tissue-like fabric backing having a porous capillary structure capable of absorbing liquid perspiration and which is strong and tough enough for surgical tape functioning whether dry or wet; and (B) a thin smooth visibly-continuous hydrophobic transparent skin-adhering pressure-sensitive adhesive coating upon and interlocking with the fibers of one side of the backing to provide a unitary uniform but microporous fibro-adhesive web structure, the adhesive coating having a vast number per square inch of randomly-varying minute closely-spaced pores communicating with the interfilar backing pores and sufficing to transmit perspiration in either liquid or vapor state when the tape is adhered to human skin such that the entire contacted skin area is maintained in a dry ventilated state under ordinary conditions; said adhesive coating essentially consisting of a water-insoluble hydrophobic aggressively-tacky highly-cohesive rubbery pressure-sensitive adhesive polymer, the adhesive having a composition that is relatively nonirritating to the human skin and being so firm and rubbery that the tape can be readily and comfortably removed from the skin after prolonged adhering contact.

2. A nonwoven fibrous translucent microporous breathable surgical adhesive tape having a caliper thickness of about 4 to 6 mils and consisting essentially of: (A) a thin compacted tissue-like web of randomly interlaced staple rayon fibers, having a length of about 1 to 2 inches and having a weight of about 75 to 100 pounds per thousand square yards, which fibers are individually coated and are interbonded at their crossing points by a nontacky hydrophobic rubbery fiber-sizing polymer having a weight of about 30–70% of the total fabric weight, such as to provide water-repellent sized fibers and wet strength in a unified resilient inextensible reticular tissue-like fabric backing having a porous capillary structure capable of absorbing liquid perspiration and which is strong and tough enough for surgical tape functioning whether dry or wet and yet is readily finger-tearable; and (B) a thin smooth visibly-continuous hydrophobic transparent skin-adhering pressure-sensitive adhesive coating upon and interlocking with the fibers of one side of the backing to provide a unitary uniform but microporous fibro-adhesive web structure, the adhesive coating having a vast number per square inch of randomly-varying minute closely-spaced pores communicating with the interfilar backing pores and sufficing to transmit perspiration in either liquid or vapor state when the tape is adhered to human skin such that the entire contacted skin area is maintained in a dry ventilated state under ordinary conditions; said adhesive coating having a weight of the order of 50 pounds per thousand square yards and essentially consisting of a water-insoluble hydrophobic aggressively-tacky highly-cohesive rubbery pressure-sensitive adhesive polymer, the adhesive having a composition that is relatively nonirritating to the human skin and being so firm and rubbery that the tape can be readily and comfortably removed from the skin after prolonged adhering contact.

3. A surgical adhesive tape according to claim 2 wherein said pressure-sensitive adhesive polymer is a pure rubbery aggressively-tacky copolymer of isooctyl acrylate and acrylic acid in approximately 94:6 ratio.

4. A surgical adhesive tape according to claim 2 wherein said fiber sizing polymer is a nontacky rubbery acrylate polymer.

5. A surgical adhesive tape according to claim 2 wherein said fiber-sizing polymer is a nontacky rubbery acrylate polymer, and said pressure-sensitive adhesive polymer is a pure rubbery aggressively-tacky copolymer of isooctyl acrylate and acrylic acid in approximately 94:6 ratio.

References Cited in the file of this patent

UNITED STATES PATENTS

| | | |
|---|---|---|
| Re. 24,906 | Ulrich | Dec. 13, 1960 |
| 2,407,549 | Gurwick | Sept. 10, 1946 |
| 2,442,876 | Pearson | June 8, 1948 |
| 2,646,771 | Salditt | July 28, 1953 |
| 2,798,820 | Nelson | July 9, 1957 |
| 3,012,911 | Moser | Dec. 12, 1961 |

OTHER REFERENCES

Emery et al.: Paper Trade Journal, pp. 39–40, Mar. 25, 1957. (Copy of article entitled "Where are Synthetic-Fiber Papers Headed?" in Div. 25.)